United States Patent [19]

Baraszu et al.

[11] Patent Number: 4,936,401
[45] Date of Patent: Jun. 26, 1990

[54] STEERING SYSTEM FOR A VEHICLE

[75] Inventors: Robert C. Baraszu, Dearborn; Algis Oslapas, Dearborn Heights; Manfred Rumpel, Birmingham, all of Mich.

[73] Assignee: Ford Motor Company, Dearborn, Mich.

[21] Appl. No.: 290,679

[22] Filed: Dec. 27, 1988

[51] Int. Cl.⁵ .............................................. B62D 5/20
[52] U.S. Cl. .................................... 180/79.1; 180/140; 180/141; 280/91
[58] Field of Search ................... 180/79.1, 140; 280/91

[56] References Cited
U.S. PATENT DOCUMENTS

| | | | |
|---|---|---|---|
| 4,582,334 | 4/1986 | Tashiro et al. | 280/91 |
| 4,671,523 | 6/1987 | Naumann | 280/91 |
| 4,673,189 | 6/1987 | Kanazawa et al. | 280/91 |
| 4,690,431 | 9/1987 | Ito et al. | 280/91 X |

Primary Examiner—Mitchell J. Hill
Attorney, Agent, or Firm—Jerome R. Drouillard; Roger L. May

[57] ABSTRACT

A steering system for a vehicle having steerable roadwheels on more than one axle includes a manually operable front steering gear for steering the front wheels of the vehicle, an electronically controlled second steering gear for steering the roadwheels of the vehicle on a second axle and a control system for operating the second steering gear, with the control system including paired steering position sensors within each of the steering gears.

15 Claims, 4 Drawing Sheets

STEERING SYSTEM FOR A VEHICLE

BACKGROUND OF THE INVENTION

1. Field of the Invention

This invention relates to a steering system for a vehicle having steerable roadwheels located on multiple axles.

DISCLOSURE INFORMATION

Multiple axle steering systems commonly in use in automotive vehicles have taken a variety of forms. In a first form as exemplified by U.S. Pat. No. 4,582,334, the front and rear steering gears of the vehicle are coupled by means of a driveshaft which precisely controls the motion of the rear steering gear in response to the inputs of the driver. Other types of four-wheel steering systems as exemplified by U.S. Pat. Nos. 4,671,523; 4,673,189 and 4,690,431 employ electronic means for controlling the rear steering gear. These systems present an additional control problem inasmuch as the control module for the steering system must, at all times, keep track of the front and rear steering positions. As shown in the '523 patent, steering position sensors 40 and 42 account for the operational position of the front and rear wheels respectively.

For any multiple axle steering system, it is crucial that the system control module have the capability of precisely tracking the operational position of each of the steering gears mounted upon the vehicle. If only a single sensor is employed at each of the steering gears, it is possible that steering control could be adversely affected if the sensor's output were to drift out of adjustment. Failure of either sensor could also adversely affect operation of the system. Were either of these conditions to occur, operation of the system will be seriously impaired because the control module will not know the precise angle or position at which one or even both of the steering gears is being operated. As a result, the driver of the vehicle could be faced with a difficult task while attempting to control the vehicle.

It is an object of the present invention to provide a steering system for a multiple steered axle vehicle in which the sensors used for the purpose of determining the position in each of the steering gears will be checked and recalibrated as the system is operating.

It is another object of the present invention to provide a control system for a four-wheel steering system in which failure of the primary steering sensors mounted upon either of the front or rear steering gears will be readily detectable.

It is an advantage of the present invention that a control system according to this invention will allow accurate and reliable operation of four-wheel or other types of multiple wheel steering systems.

Other objects, features and advantages of the present invention will become apparent to the reader of the specification.

SUMMARY OF THE INVENTION

In accordance with this invention, a steering system for a vehicle having steerable front and rear roadwheels comprises a manually operable front steering gear for steering the front wheels of the vehicle, an electronically controlled rear steering gear for steering the rear wheels of the vehicle, and control means for operating the rear steering gear. The control means comprises first sensor means for sensing the on-center position of the front steering gear and for providing a front center signal to a control module whenever the front steering gear is centered and second sensor means for sensing the on-center position of the rear steering gear and for providing a rear center signal to the control module whenever the rear steering gear is centered. The control means further comprises third sensor means for sensing the position of the front steering gear at any point along its travel path and for providing a corresponding front steering position signal to the control means, and fourth sensor means for sensing the position of the rear steering gear at any point along its travel path and for providing a corresponding rear steering position signal to the control module. This system may be used to control the steering position of the rear steering gear according to at least the steering position of the front steering gear.

A steering system according to the present invention further comprises means responsive to the front and rear center signals for calibrating the third and fourth sensor means by recording the value of the front steering position signal when the front center signal is present and by recording the value of the rear steering position signal when the rear center signal is present. The calibration means may further comprise means for determining a mean value for each of the recorded front and rear steering position signals. Thereafter, the front and rear steering position signals may be determined by comparing the instantaneous value of the position signal generated by each of the third and fourth sensor means with recorded mean values corresponding to each of said signals. The control means may further comprise means for comparing the calculated mean values of each of the recorded front and rear steering position signals with respective pairs of threshold values and means for generating a warning signal in the event that either or both of the calculated mean steering signal values lies outside of the appropriate threshold value ranges. A system according to this invention may further comprise means responsive to such a warning signal for disabling the operation of the rear steering gear.

A system according to the present invention may be utilized in conjunction with a front steering gear comprising a slidable element mounted within a housing and coupled to the front roadwheels of the vehicle so as to provide steering force to the roadwheels, with the first sensor means comprising a detector for signaling whenever the sliding element is in the center of its travel. Similarly, the rear steering gear may comprise a slidable element mounted within a housing and coupled to the rear roadwheels of the vehicle so as to provide steering force to the roadwheels, and with the second sensor means comprising a detector for signaling whenever the slidable element located within the rear steering gears is in the center of its travel. The third and fourth sensor means may comprise detectors for sensing the position of the slidable elements in the front and rear steering gears respectively, at any point along the sliding element's travel paths.

Another aspect of the present invention involves a method for operating a steering system for a vehicle comprising the steps of sensing the center position of a first steering gear associated with the front wheels of the vehicle by a first steering position sensor means; recording the value of a signal generated by a second steering position sensor means associated with the first steering gear upon sensing of the center position by the first sensor means; sensing the center position of a second steering gear, associated with the rear wheels of the vehicle, by a third steering position sensor means; recording the value of a signal generated by a fourth steering position sensor means associated with the second steering gear upon sensing of the center position by a third sensor means, and comparing values derived by the recorded signal values from the second and fourth sensor means with the instantaneous outputs of the second and fourth sensor means to determine the instantaneous steering positions of the first and second steering gears, respectively. The instantaneous outputs of the second and fourth sensor means may be compared with corresponding calculated mean values of the recorded signals from the second and fourth steering position sensors.

DESCRIPTION OF THE PREFERRED EMBODIMENTS

Figure 1:
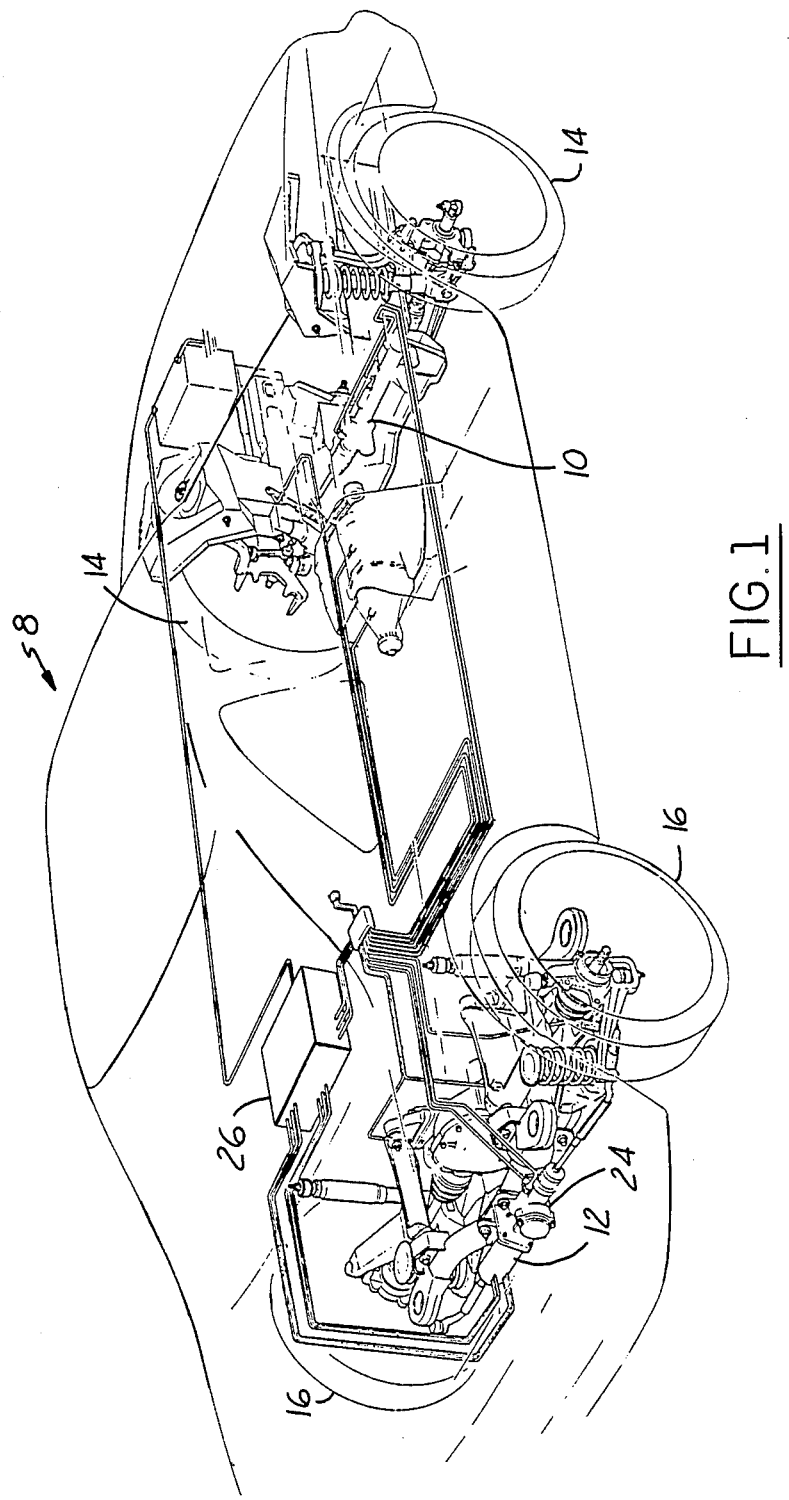
FIG. 1 is a phantom perspective view of a vehicle having a steering system according to the present invention.

As shown in FIG. 1, a vehicle, 8, equipped with the present invention has front and rear steerable roadwheels 14 and 16, respectively. Those skilled in the art will appreciate in view of this disclosure that a system according to the present invention could be applied to vehicles having steerable roadwheels on more than two axles. A system according to the present invention includes, inter alia, front steering gear 10 and rear steering gear 12, which steer the front and rear roadwheels 14 and 16, respectively. Front on-center sensor 18 is included in the front steering gear, while rear on-center sensor, 20 is included in the rear steering gear. Details of such sensors will be shown in the discussion of FIG. 2 of this specification.

Figure 3:
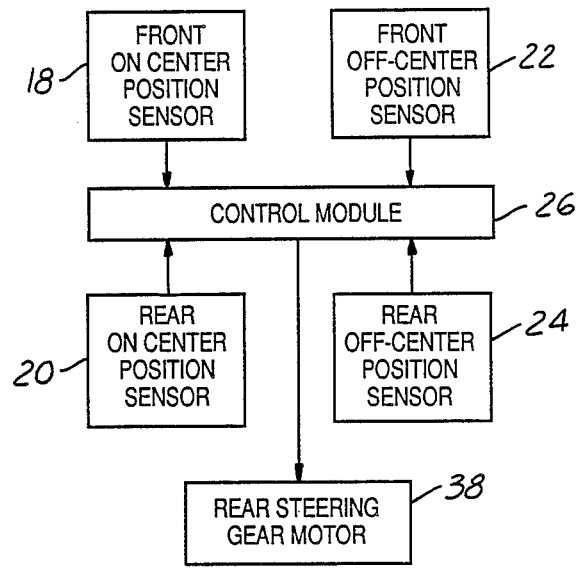
FIG. 3 is a block diagram of a portion of a system according to the present invention, showing the system control module and the sensors employed for the purpose of tracking the operational positions of each of the steering gears included in the vehicle.

The front and rear steering gears further include front travel path sensor 22 and rear travel path sensor 24, respectively. Because the travel path sensors are used for the purpose of detecting the position of the steering racks whenever the racks are not centered, the travel path sensors are labeled in FIG. 3 as "off-center position" sensors. Each of the sensors communicates with control module 26. The arrangement of the sensors and the control module are shown in FIG. 3.

The control module comprising a microprocessor including a ROM in which is stored various constants and control programs for operating the steering system of the present invention, as well as a CPU for reading out control programs for the ROM so as to execute recorded operations and a RAM which temporarily stores various data related to the operations to be executed within the CPU. The microprocessor further includes various input-output devices for controlling various input and output signals to and from the microprocessor. Those skilled in the art will appreciate in view of this disclosure that a variety of microprocessor architectures could be used with a system according to the present invention.

Figure 2:
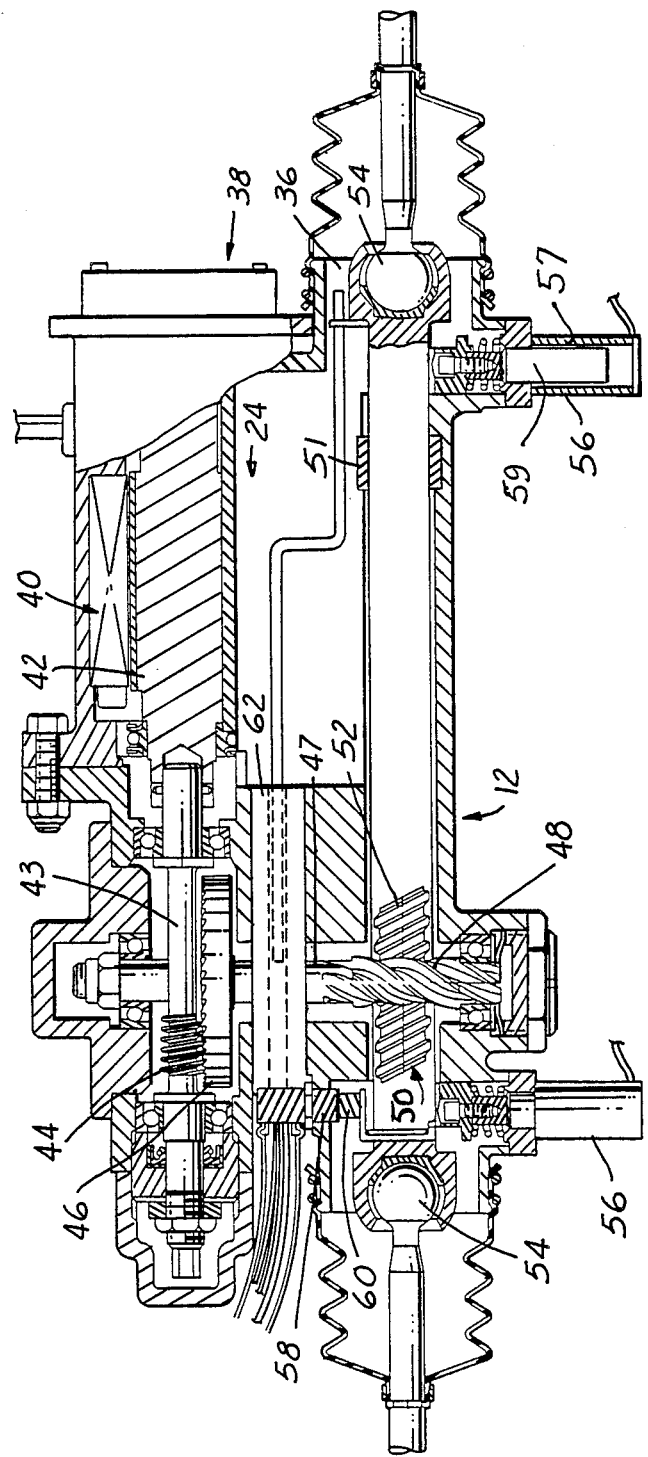
FIG. 2 is a partially cutaway view of a rear steering gear showing sensors for a system according to the present invention.

FIG. 2 shows details of rear steering gear 12, it being understood that the sensor system shown in the rear steering gear is replicated in the front steering gear. Continuing with FIG. 2, the steering gear is noted to be electronically controlled and driven by motor 38, having stator windings 40 and armature 42. In contrast, front steering gear 10 is manually operable. The present system is compatible with both power assisted and non-power assisted front steering gears of various types such as hydraulic or non-hydraulic worm and sector and other types. Similarly, a system according to the present invention is compatible with hydraulically driven rear steering gears as well as the illustrated electrically driven gear.

The steering gear shown in FIG. 2 operates as follows. As motor shaft 43 and spiroid motor pinion 44 rotate in response to commands from control module 26, the motor pinion propels face gear 46, which is mounted upon pinion shaft 47. Rack pinion 48, which is formed in pinion shaft 47, meshes with teeth 52 which are formed in rack 50. In sum, as motor 38 rotates in response to commands from control module 26, rack 50 will be caused to slide back and forth within housing 36, thereby steering rear roadwheels 16. Front steering gear 10 is similarly constructed with a rack and pinion drive, where the rack pinion is operated by the driver of the vehicle rather than by an electric motor.

Control module 26 will track the position of rack 50 at all times by means of two sensor devices built into each steering gear. Each of the front and rear steering gears uses a pair of sensors for sensing the on-center position of the steering rack by means of one sensor, while using a second sensor to sense the position of the rack at any point along its travel path. To this end, each steering gear is provided with an on-center position sensor comprising, in FIG. 2, Hall Effect device, 58, which is mounted within steering gear housing 36. The Hall Effect device is triggered by magnet 60, which is rigidly attached to the rack and which reciprocates therewith as the rack slides back and forth during steering motion. The Hall Effect sensor is triggered and gives a signal when magnet 60 is in proximity thereto. Accordingly, when the Hall Effect sensor is triggered, control module 26 will be alerted that steering rack 50 and hence, rear steering gear 12, is in the center position. Taken together, Hall Effect sensor 58 and magnet 60 comprise rear on-center position sensor 20.

As noted above, each steering gear has yet another position sensor. LVDT 24 (linear variable differential transformer) senses the position of rack 50 at any point along its travel path and provides a steering position signal to control module 26. LVDT 24 includes coil 62 and plunger 64. The LVDT provides a voltage signal which is proportional to the position of plunger 64 within coil 62. In other words, the output of the LVDT provides a direct indication of the position of rack 50 along its travel path.

Figure 4:
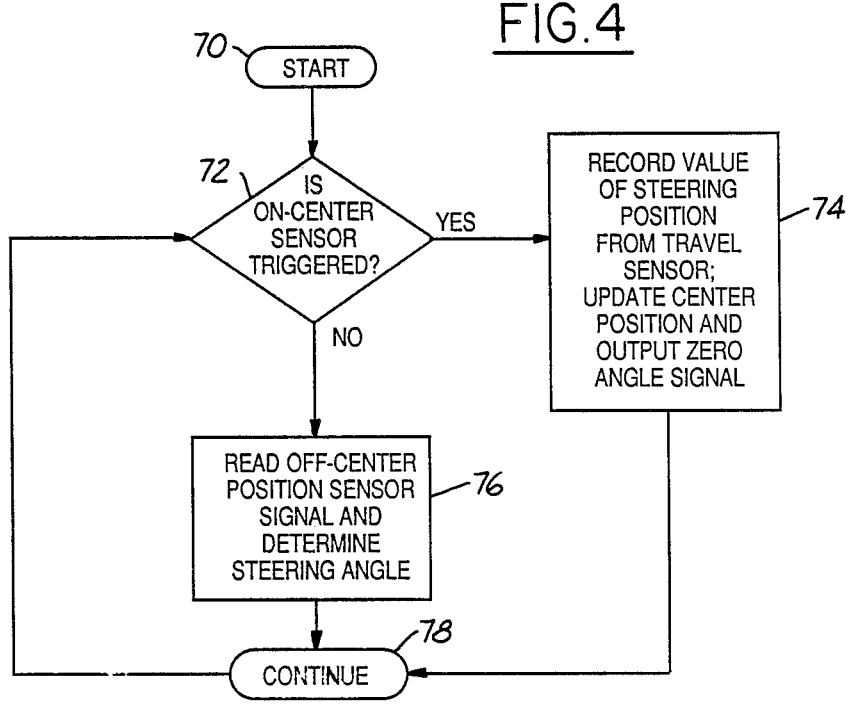
FIG. 4 is a logic flow diagram of a portion of a system according to the present invention.

Hall Effect sensor 58 is employed for the purpose of calibrating LVDT 24. The interaction of the two types of sensors is shown in FIG. 4. After starting at block 70, each time one of the Hall Effect devices is triggered at block 72, control module 26 will sense that steering gear 12 is in the center of its travel position. Accordingly, LVDT 61 may be calibrated by recording the value for the rear steering position signal from LVDT 24 at block 74 whenever the rear center signal produced by Hall Effect device 58 is present. At the same time, a zero steering angle signal may optionally be generated. Similarly, Hall Effect device 18 and LVDT device 22, within front steering gear 10, will allow control module 26 to calibrate the front position signal by recording the value of the front steering position signal from LVDT 18 when the front center signal has been received from the front Hall Effect device. In the event that the answer to the question posed at block 72 is negative, the program within the control module's microprocessor will continue to block 76, wherein the off-center position sensor signal will be read for the purpose of determining the steering angle.

The front and rear steering position signals received by control module 26 whenever either of the Hall Effect devices has been triggered are recorded at block 74, and a mean value is determined for each of the series of recorded signals. This will provide an accurate indication of the front and rear steering position signals which correspond to the actual, or real, center position of each steering gear.

At any particular instant, the front and rear steering gear rack positions may be determined at block 76 by comparing the instantaneous output of each LVDT with the appropriate recorded mean value corresponding to the center position of each steering gear. For example, if each LVDT is operated at 0 to 5 volts, then 2.5 volts will correspond to the nominal center position, and a reading of, for example, 3.5 volts from the LVDT may be compared with the 2.5 volt value to give a 1 volt differential. This will indicate a given degree of steering. If, however, the output of the front or rear LVDT drifts, so that the output reads 2.6 volts when the appropriate Hall Effect sensor indicates center position, control module 26 will realize that 2.6 volts corresponds to the center position because 2.6 volts will be recorded at the time a signal is received from the appropriate Hall Effect sensor. Accordingly, if the steering rack were not equipped with Hall Effect on-center sensing, the control module would have no way of realizing that 2.6 volts, and not 2.5 volts, corresponds to the on-center position of the steering gear.

Control module 26 may further include a program for comparing the calculated mean values of the front and rear steering position signals recorded from the LVDT outputs with respective pairs of threshold values corresponding to the front and rear steering gears. If the recorded outputs fall outside the threshold values, a warning signal may be issued and the rear steering gear disabled. For example, if the nominal center position of the rear steering gear corresponds to 2.5 volts output from the LVDT on a 5 volt scale, and if the calculated mean value of the on-center LVDT voltage increases to 5 volts, control module 26 will have reason to suspect the accuracy of the LVDT and will, therefore, issue a warning signal or disable steering gear 12. This disablement could be accomplished by cutting off all power to motor 38. Alternatively, steering gear 12 could be disabled by means of travel limiting devices 56, comprising spring loaded pins, 59, (FIG. 2), which extend into the travel paths of inner tie-rod ends 54. Pins 59 are maintained in their extended position unless retracted by solenoids 57.

A second warning signal may be issued in the event that either no output, or a clearly erroneous output is received by the control module from either of the Hall Effect devices when the output of the appropriate LVDT moves through the calculated mean value of the recorded LVDT signals.

It may thus be seen that the sensors and control module comprise a calibration means for maintaining the values of the steering position signals in correspondence with the actual steering positions of the front and rear steering gears. This allows the control module to operate the rear steering gear according to at least the steering position of said front steering gear.

Another aspect of the present invention involves a method for operating a steering system for a vehicle including the steps of sensing the center position of a front steering gear by a first steering position sensor means, which may, for example, comprise the previously illustrated Hall Effect device, and by recording the value of a signal generated by a second steering position sensor means, for example, the illustrated LVDT, associated with the front steering gear upon sensing of the center position by the Hall Effect sensor. A method according to the present invention further includes the steps of sensing the center position of a rear steering gear associated with the rear wheels of the vehicle by a third steering position sensor means comprising, for example, the illustrated Hall Effect device, and recording the value of the signal generated by a fourth steering position means associated with the rear steering gear upon sensing of the center position by the third sensor means. Finally, a method according to the present invention includes the step of comparing values derived from the recorded signal values from the second and fourth sensor means with the instantaneous outputs of the second and fourth sensor means to determine instantaneous steering positions of the first and second steering gears, respectively. In the illustrated embodiments, this method includes recording the values of the signals generated by the LVDT means in each of the steering gears at the time the on-center signals are received. In this manner, the recorded values may be compared with the instantaneous values from the LVDT devices so as to obtain a steering signal at any location along the travel paths of the steering gears.

A system according to the present invention presents a further advantage over prior art systems inasmuch as the combination of LVDT and Hall Effect sensors may be used in the assembly process of the vehicle to obtain a calibration for the LVDT. Finally, the Hall Effect sensors may be used for precisely centering the steering gears whenever the alignment of either the front or rear steering gears is adjusted.

Figure 5:
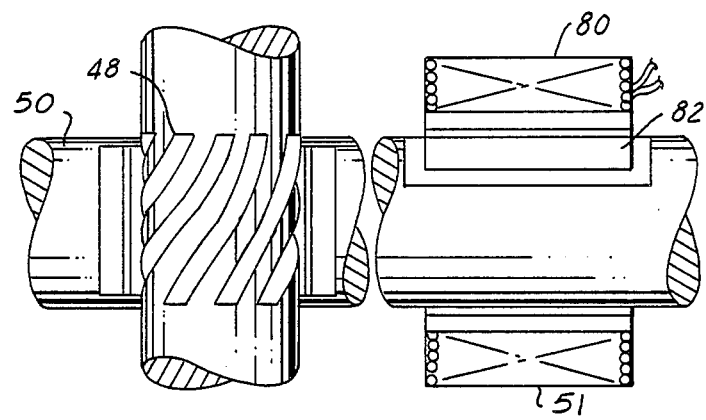
FIG. 5 illustrates a second embodiment of an off-center steering position sensor which is useful for practicing the present invention.

It will be understood that the invention herein is not to be limited to the exact constructions shown and described and that various changes and modifications may be made without departing from the spirit and scope of the invention as defined by the appended claims. Merely by way of example, without limitation, the Hall Effect sensors could be replaced by mechanical switches or other types of devices designed and intended to detect the center point of steering gear operation. Also, the LVDT devices could be replaced by other types of sensing devices known to those skilled in the art and suggested by this disclosure. An example of a second type of off-center rack position sensor is shown in FIG. 5, wherein rack support bushing 51 (FIG. 2) is replaced by a bushing containing a coil of wire, 80. A permanent magnet, 82, is embedded in rack 50. As magnet 82 is moved into and out of register with coil 80, the magnetic flux induced in the coil will change. As a result, if coil 80 is subjected to a constant voltage drop, the current passing through the coil will be proportional to the magnetic flux passing through the coil, and hence, the position of magnet 82 with respect to coil 80. Therefore, by reading the current passing through coil 80, control module 26 will be able to detect the position of rack 50 throughout its travel path. Those skilled in the art will appreciate in view of this disclosure that the control system described herein may be employed for controlling an auxiliary (e.g., rear) steering gear with additional control inputs other than the steering position of the primary (e.g., front) steering gear. For example, such additional inputs could comprise vehicle speed, or other driver inputs such as accelerator position and brake operation.

We claim:

1. A steering system for a vehicle having steerable front and rear roadwheels, comprising:
    a manually operable front steering gear for steering the front wheels of said vehicle;
    an electronically controlled rear steering gear for steering the rear wheels of said vehicle; and
    control means for operating said rear steering gear according to at least the steering position of said front steering gear, with said control means comprising:
    first sensor means for sensing the on-center position of said front steering gear and for providing a front center signal to a control module whenever said front steering gear is centered;
    second sensor means for sensing the on-center position of said rear steering gear and for providing a rear center signal to said control module whenever said rear steering gear is centered;
    third sensor means for sensing the position of said front steering gear at any point along its travel path and for providing a corresponding front steering position signal to said control module and
    fourth sensor means for sensing the position of said rear steering gear at any point along its travel path and for providing a corresponding rear steering position signal to said control module.

2. A steering system according to claim 1 wherein said control means further comprises means responsive to said front and rear center signals for calibrating said third sensor means by recording the value of said front steering position signal when said front center signal is present and by recording the value of said rear steering position signal when said rear center signal is present.

3. A steering system according to claim 2 wherein said calibration means further comprises means for determining a mean value for each of said recorded front and rear steering position signals.

4. A steering system according to claim 3 wherein said front and rear steering position signals are determined by comparing the instantaneous value of a preliminary signal generated by each of said third and fourth sensor means with said recorded mean values corresponding to each of said signals.

5. A steering system according to claim 3 wherein said control means further comprises means for comparing said calculated mean values with respective pairs of threshold values and means for generating a warning signal in the event that either or both of said calculated mean values lie outside of the respective ranges of said threshold values.

6. A steering system according to claim 5 wherein said control means further comprises means responsive to said warning signal for disabling the operation of said rear steering gear.

7. A steering system according to claim 1 wherein said front steering gear comprises a slidable element mounted within a housing and coupled to the front roadwheels of said vehicle so as to provide steering force to said roadwheels, with said first sensor means comprising a detector for signaling whenever said slidable element is in the center of its travel.

8. A steering system according to claim 1 wherein said rear steering gear comprises a slidable element mounted within a housing and coupled to the rear roadwheels of said vehicle so as to provide steering force to said roadwheels, with said second sensor means comprising a detector for signaling whenever said slidable element is in the center of its travel.

9. A steering system according to claim 1 wherein said front steering gear comprises a slidable element mounted within a housing and coupled to the front roadwheels of said vehicle so as to provide steering force to said roadwheels, with said third sensor means comprising a detector for sensing the position of said slidable element at any point along its travel path.

10. A steering system according to claim 1 wherein said rear steering gear comprises a slidable element mounted within a housing and coupled to the rear roadwheels of said vehicle so as to provide steering force to said roadwheels, with said fourth sensor means comprising a detector for sensing the position of said slidable element at any point along its travel path.

11. A steering system according to claim 1 wherein said first and second sensor means each comprises a Hall Effect sensor.

12. A steering system according to claim 1 wherein said third and fourth sensor means each comprises a linear variable differential transformer.

13. A steering system for a vehicle having steerable front and rear roadwheels, comprising:
    a manually operable rack and pinion front steering gear for steering the front wheels of said vehicle;
    an electronically controlled rear steering gear for steering the rear wheels of said vehicle; and
    control means for operating said rear steering gear according to at least the steering position of said front steering gear, with said control means comprising:
    sensor means for sensing the position of said rack at any point along its travel path and for providing a front steering position signal to a control module;
    sensor means for sensing the position of said rear steering gear at any point along its travel path and for providing a rear steering position signal to said control module; and
    calibration means for maintaining the values of said steering position signals in correspondence with the actual steering positions of said front and rear steering gears.

14. A method for operating a steering system for a vehicle, comprising the steps of:
    sensing the center position of a first steering gear, associated with the front wheels of said vehicle, by a first steering position sensor means;
    recording the value of a signal generated by a second steering position sensor means associated with said first steering gear upon sensing of said center position by said first sensor means;

sensing the center position of a second steering gear, associated with the rear wheels of said vehicle, by a third steering position sensor means;

recording the value of a signal generated by a fourth steering position sensor means associated with said second steering gear upon sensing of said center position by said third sensor means; and comparing values derived from said recorded signal values from said second and fourth sensor means with the instantaneous outputs of said second and fourth sensor means to determine the instantaneous steering positions of said first and second steering gears, respectively.

15. A method according to claim 14, wherein the instantaneous outputs of said third and fourth sensor means are compared with corresponding calculated mean values of said recorded signals.

* * * * *